May 9, 1950 J. F. SCHACHT 2,507,460
VISUAL AID FOR MATHEMATICS
Filed Oct. 3, 1946 3 Sheets-Sheet 1
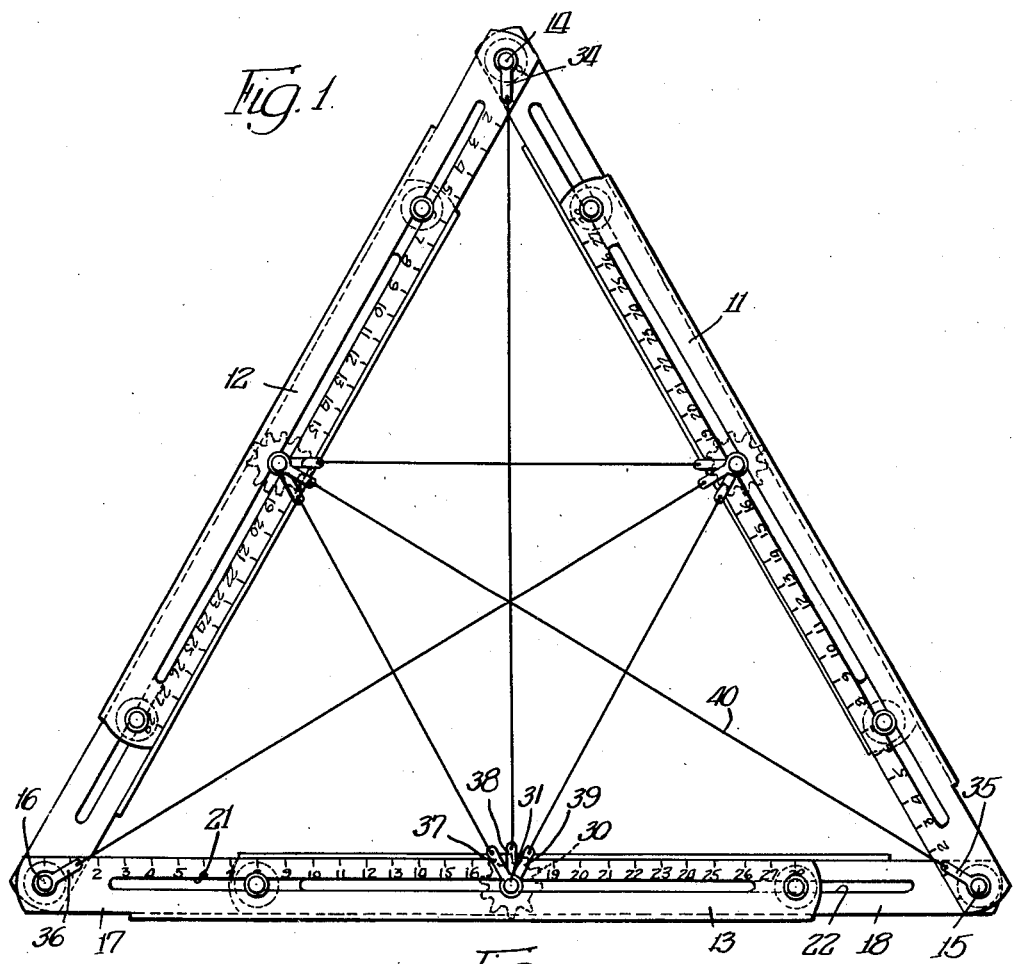
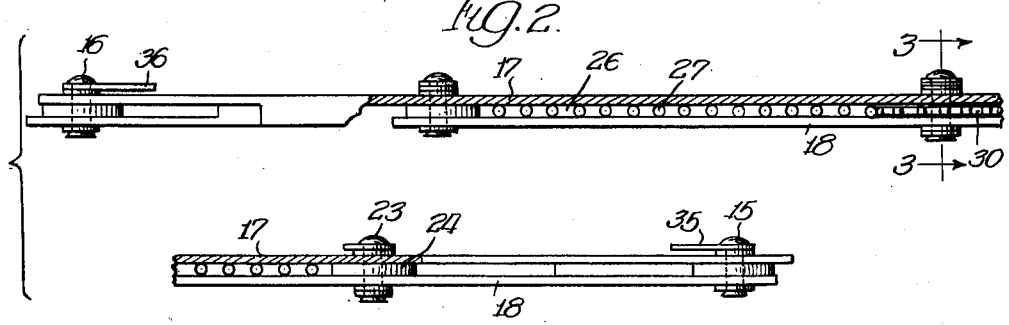
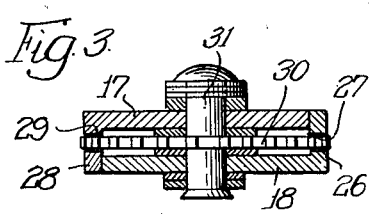
INVENTOR.
John F. Schacht,
BY
Wilkinson Huxley Byron & Knight
attys.

INVENTOR.
John F. Schacht,

May 9, 1950 J. F. SCHACHT 2,507,460
VISUAL AID FOR MATHEMATICS
Filed Oct. 3, 1946 3 Sheets-Sheet 3

INVENTOR.
John F. Schacht
BY
Wilkinson Huxley Byron & Knight
Attys.

Patented May 9, 1950

2,507,460

UNITED STATES PATENT OFFICE 2,507,460

VISUAL AID FOR MATHEMATICS

John F. Schacht, Columbus, Ohio, assignor to W. M. Welch Manufacturing Company, Chicago, Ill., a corporation of Illinois Application October 3, 1946, Serial No. 701,006

4 Claims. (Cl. 35—34)

This invention relates to new and improved devices for use as visual aids in instruction in mathematics and more specifically to devices in the form of triangles, quadrilaterals or other figures in which the lengths of the sides and their angular relationship may be varied.

The construction may be used in the form of two or three dimensional figures and may include lines intersecting sides or angles at desired angles in addition to the sides or lines defining the figures. Devices of this character are of material aid in teaching classes in related subjects such as geometry and trigonometry and assist the student in visualizing the figure and its various properties. The figures are continuously variable as to length of side and angular relationships so that the student may visualize the various forms the figure may take.

It is an object of the present invention to provide new and improved visual aids for use in connection with mathematical instruction or study.

It is a further object to provide devices which are readily adjustable as to dimensions and angular relationship.

It is an additional object to provide devices in which flexible members are provided to define and show interior relationships as to areas and angles within a figure defined by the device.

It is also an object to provide devices which are simple in design and construction and adapted for commercial production and use.

Other and further objects will appear as the description proceeds.

I have shown certain preferred embodiments of my invention in the accompanying drawings, in which—

Figure 1 is a plan view of one form of construction showing a triangle;

Figure 2 is a partly broken away elevation of one side of the triangle;

Figure 3 is an enlarged section taken on line 3—3 of Figure 2;

Figure 4:
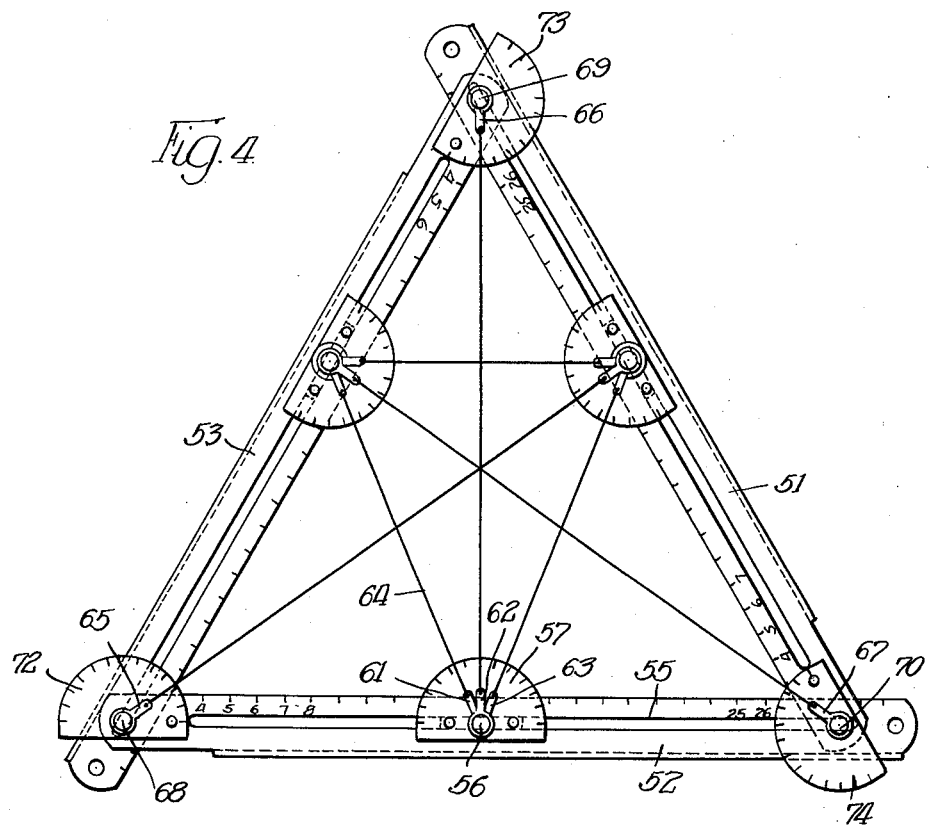
Figure 4 is a plan view similar to Figure 1 but showing a modified form of construction.

Referring first to the form of construction shown in Figure 1, this shows a triangular figure having the three similar side assemblies 11, 12 and 13 pivoted at their ends by pivot members 14, 15 and 16. Each side assembly comprises a pair of interfitted members 17 and 18 so designed so that they may be slid relative to each other to cause the side assembly to have differing lengths, as desired, between its end pivots. The members 17 and 18 are provided with the elongated slots 21 and 22, respectively, which receive guide pins carried by the adjacent member.

As shown in Figure 2, the upper member 17 carries the pivot pin 16 at its left end for connection to the adjacent side assembly 12. At its right end, as shown in the lower portion of Figure 2, this member 17 carries the pin 23 which slides in the slot 22 in member 18. A block 24 is provided fitted on pin 23 and located between members 17 and 18 in order to maintain the proper spacing. As shown in Figure 2, the upturned edge 26 of member 18 is provided with a plurality of evenly spaced circular openings 27. In Figure 3, the downturned edge 28 of member 17 is shown as provided with a similar series of openings 29. The star wheel or gear wheel 30 is fitted between the members 17 and 18 on the pivot member 31, the points of the star wheel fitting into the opposite series of openings 27 and 29.

As best shown in Figure 1, the pivot members 14, 15 and 16 are provided with connecting lugs 34, 35 and 36. The pivot pin 31 carries a plurality of lugs 37, 38 and 39 similar to the lugs carried by the corner pivot members. These various connecting lugs are connected, as shown in Figure 1, to other lugs by means of extensible members 40. These members 40 are preferably formed of material such as rubber which is capable of considerable extension while remaining in a straight line between the two points to which it is connected.

In the assembly of the parts, the star wheels 30 are located relative to members 17 and 18 so that they are spaced halfway between the end pivots 15 and 16. As will be apparent from Figure 1, the three sides 11, 12 and 13 are all identical and are provided with multiple members 40 between the several connecting lugs. It will be apparent that when the connections 17 and 18 of any side assembly are slid relative to each other in either direction within the limits of movement, the star wheel will maintain the pivot pin 31 at a point halfway between the adjacent end pivots 14, 15 and 16.

Figure 5:
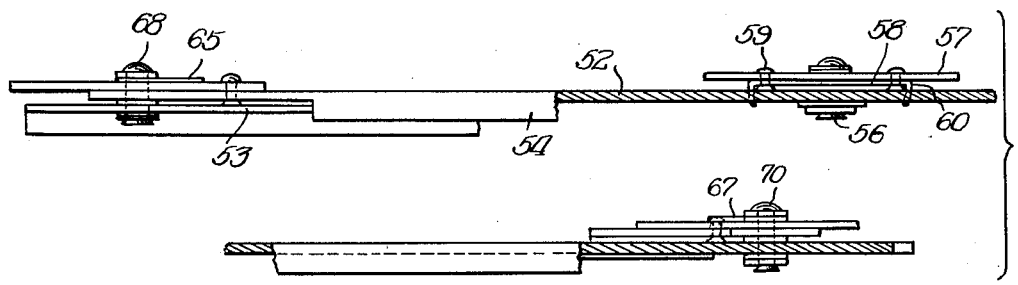
Figure 5 is a partly broken away elevation, on an enlarged scale, of one side of Figure 4.

The form of construction shown in Figures 4 and 5 differs from that shown in Figures 1, 2 and 3 in that the sides themselves are not extensible. As shown in Figure 4, the triangle is provided with the three side members 51, 52 and 53. The member 52 is shown in elevation and partly broken away in Figure 5. This member 52 has a downturned edge 54 to stiffen the member. It is provided with a longitudinal slot 55 into which is fitted a pin 56 which may be slid lengthwise of the slot to any desired position. This pin 56 carries a protractor in the form of a graduated semi-circle 57. The protractor is maintained in proper relationship to the member 52 by means of a U-shaped member 58 held to the protractor by rivets 59 and having downturned ends 60 which slide in the slot 55.

The pin 56 also carries three connecting lugs 61, 62 and 63 which are connected by flexible extension members 64 to similar lugs on adjacent side elements and to lugs 65, 66 and 67 carried on the corner pivot pins 68, 69 and 70. These corner pins are fixedly secured in one side member and slide in the elongated slot in the adjacent corner member.

The several side members 51, 52 and 53 are all identical in construction and it will be apparent that each may have a greater or less portion of its length included in the triangle formed by the three members within the limits of the movement of the elongated slot formed in the member. The center pins are not mounted in the center of the side as in the construction of Figures 1 to 3, but may be slid to any desired point within the limits of the slot. In order that the relative location of the center sliding pins and the protractor may be determined, each member 51, 52 and 53 is provided with a scale, the zero point of which is the fixed pivot member carried by that side. It will be noted that the corner pivot members 68, 69 and 70 are provided also with protractors 72, 73 and 74. Thus, by means of the various protractors, the angles between the sides of the triangle may be read off and also the angles formed by the connections 64 with the points located along the sides or at the corners of the figure may be read.

Figure 6:
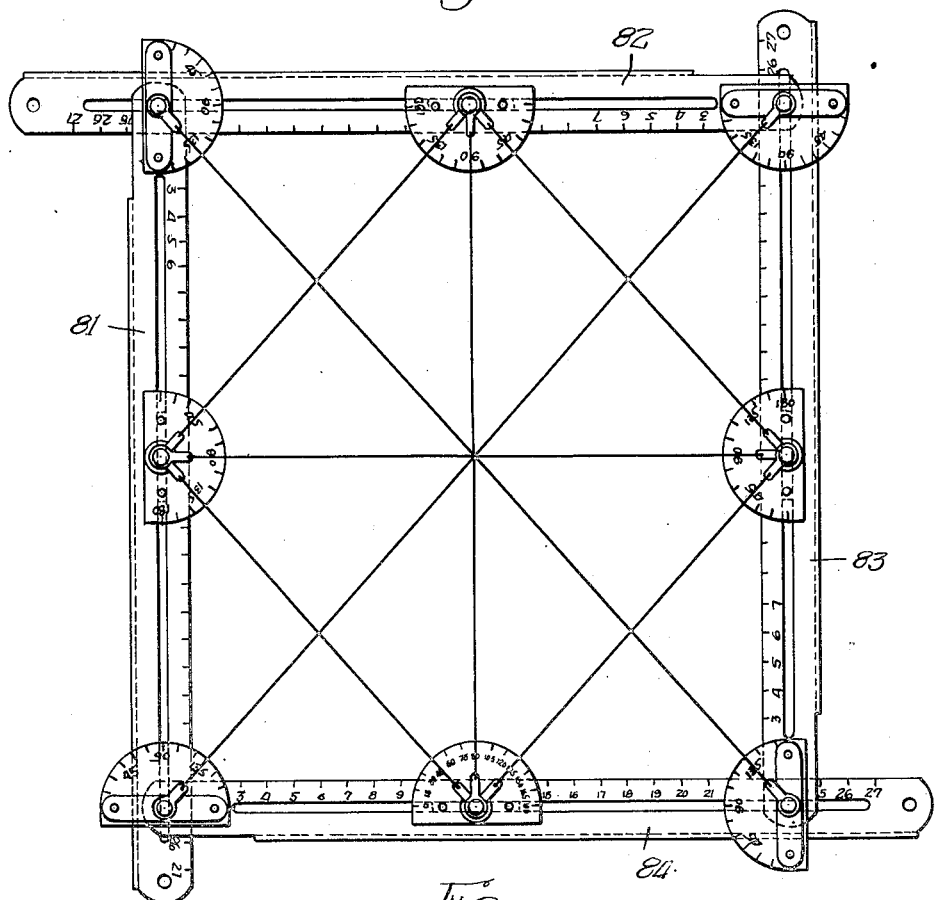
Figure 6 is a plan view of a construction similar to Figure 4 but applied to a four sided figure.
Figure 7:
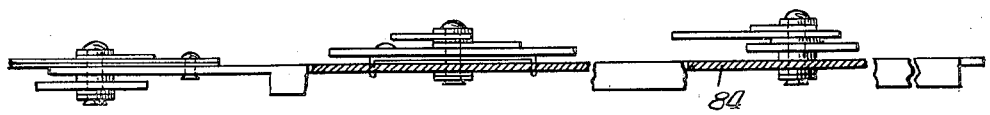
Figure 7 is an elevation, partly broken away, showing one side of Figure 6 on an enlarged scale.

The form of construction shown in Figures 6 and 7 is similar to that shown in Figures 4 and 5 with the exception that four sides 81, 82, 83 and 84 are provided. Thus, the device may be used to determine the relationships between the angles in different forms of four sided figures. They also show visually the relationships between lines connecting midpoints of the sides with the other midpoints or with the angles formed by the junctions of the sides of the figure. In this case, also, the sides are provided with scales as the protractor slidably carried by each side is not limited to the midpoint, but may be placed on any point desired on the side.

While I have shown only triangular and four sided figures in examples given in the drawings, it will be understood that the invention is not limited as to the number of sides which may be provided, nor is it limited to plane figures. The construction is useful in the teaching of the relationships of the parts of triangles, quadrilaterals or other figures to other parties and may be adjusted, as desired, during the instruction of an individual or large classes. It is also useful in connection with individual study of the properties of such figures.

While I have shown certain preferred embodiments of my invention, these are to be understood to be illustrative only as it is capable of variation to meet different conditions and requirements, and I contemplate such modifications as come within the spirit and scope of the appended claims.

I claim:

1. A mathematical device comprising at least three side units pivotally connected together at fixed points adjacent their ends to form a figure defined by the units, each unit comprising members slidable relative to each other for varying the lengths of the units, devices carried by the units engaging the members and thereby maintained at the mid points of said units throughout their variation in length, and further members connecting the mid point devices of certain of the units, said further members being extensible to conform to different adjustments of the units.

2. A mathematical device comprising at least three side units pivotally connected together at fixed points adjacent their ends, said units each comprising a pair of slidably connected elements, the connecting pivots being on the different elements of the pair whereby the effective figure forming length of said units is adjusted by sliding the elements relative to each other, rotating members associated with each pair of elements at the mid point of the pair and coacting with each element of the pair to maintain them at the mid point upon sliding of the elements relative to one another, and extensible members connected to the mid points rotating members of certain of the units and connected to other portions of the figure formed by the units, the connection of said extensible members to the mid points of the units being maintained during adjustment of the length of said units.

3. A methematical device comprising at least three side units pivotally connected together, the pivots being fixed relatively to at least one end of each unit, each unit comprising a pair of elements slidable relative to each other for adjusting the effective figure forming length of each unit, rotatable members between each pair of elements, said rotatable members having a geared connection with each element, said rotatable members forming intermediate points in fixed relation between the two ends, a plurality of members extending from said intermediate points of each of the units and connected to intermediate points and pivot points of other side units of the figure formed by the units, the points of connection of said members to the units being maintained by the geared connection in predetermined relationship to the pivot ends of the units during adjustment of the effective lengths of the units, said last members being extensible to conform to different adjustments of the units.

4. A mathematical device comprising three side units pivotally connected together at fixed points adjacent their ends, each unit comprising a pair of elements slidable relative to each other for adjusting the effective figure forming length of each unit, the paired elements having evenly spaced opposed perforations formed therein, a star wheel between the elements having points in geared association with the perforations to maintain the wheel at the mid point of the unit, a plurality of members extending from the star wheel at the mid points of each of the units and connected to the star wheel at the mid points and to pivot points of the other side units of the triangle formed by the units, the points of connection of said members to the star wheel being maintained at the mid points of the units during adjustment of the length of the units, said members being extensible to conform to different adjustments of the units.

JOHN F. SCHACHT.

REFERENCES CITED

The following references are of record in the file of this patent:

UNITED STATES PATENTS

| Number | Name | Date |
| --- | --- | --- |
| 646,661 | Hanstein | Apr. 3, 1900 |
| 1,628,426 | Prenveille | May 10, 1927 |
| 1,810,421 | Guyer | June 16, 1931 |
| 1,965,062 | Wellington | July 3, 1934 |
| 2,408,357 | Wolfe | Sept. 24, 1946 |

FOREIGN PATENTS

| Number | Country | Date |
| --- | --- | --- |
| 15,498 | Great Britain | Apr. 18, 1907 |